June 16, 1953  F. A. WHITNEY  2,641,989
SALT SPRAY

Filed Sept. 5, 1952  2 Sheets-Sheet 1

INVENTOR
FRANK A. WHITNEY

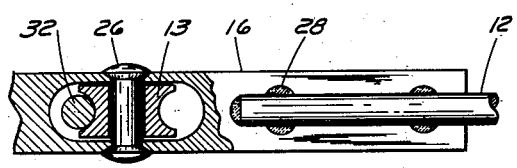
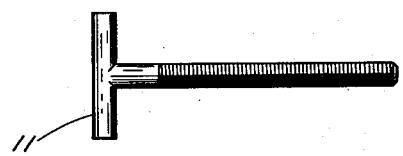
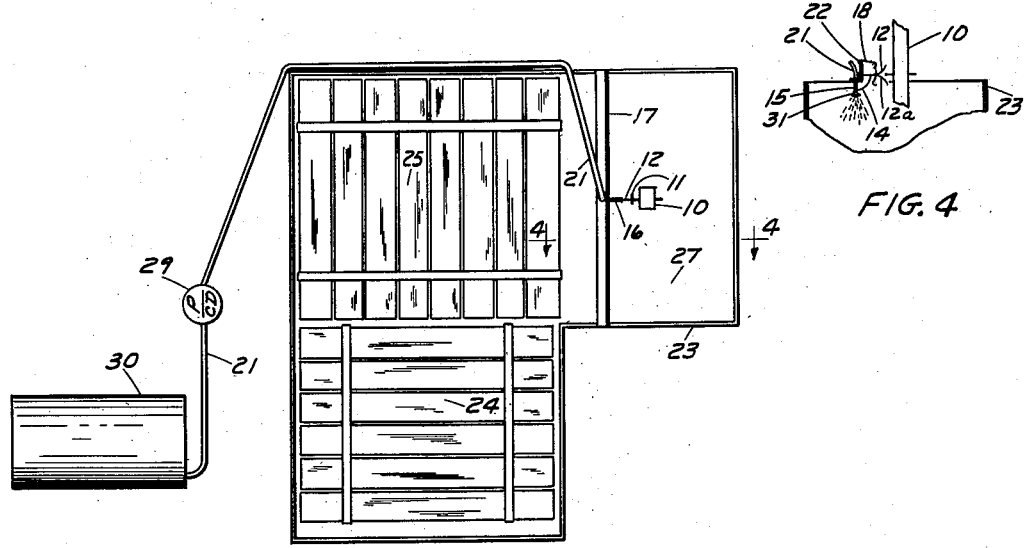

Patented June 16, 1953

2,641,989

UNITED STATES PATENT OFFICE 2,641,989

SALT SPRAY

Frank Arthur Whitney, Holt, Mich.

Application September 5, 1952, Serial No. 308,134

2 Claims. (Cl. 99—235)

This invention relates to forage baling, is particularly concerned with the application of preservatives to forage, and is more particularly concerned with the device for use in the application of preservatives to forage during the operation of baling such forage.

When forage, hay, for example, is baled and particularly when such forage contains sufficient moisture to later cause spoilage it is common practice to add chemical preservatives to the forage during the baling operation. There are a number of chemical preservatives which are commonly used for this purpose but common salt is used to the greatest extent and with the most successful results. To accomplish preservation of hay, for example, it is necessary that the preservative, salt, for example, be uniformly distributed throughout all of the hay. Attempts have been made to add the salt in solid form but no device of the prior art has been invented which will accomplish the addition of salt uniformly. Solid salt, that is, commercial sodium chloride, tends to absorb moisture from the atmosphere and becomes damp and there is a tendency for any such device to become clogged. Attempts have been made at dissolving the salt and adding it to the forage in the liquid state, but no device has been yet invented which will accomplish this satisfactorily.

It is therefore an object of the present invention to provide a device for the application of liquid preservative to forage during the operation of baling. It is a further object to provide a device for the application of preservative to forage during the operation of baling and provide for even distribution of the preservative with the forage. A still further object of the present invention is the provision of a spray device for the application of liquid preservative to forage during the baling operation of the forage.

I have now discovered and invented a spray device for the application of liquid preservative to forage during the operation of baling and am now able to avoid the disadvantages of the prior art and am able readily to accomplish the objects set forth.

While some of the more outstanding features and advantages of this invention have been hereinbefore indicated, others will become apparent from the following disclosures, taken in conjunction with the accompanying drawing, in which:

Fig. 2 is a top view of a typical hay baler looking down at the top of the baler, and showing the disposition of the spray device, and the fluid preservative tank and pump.

Fig. 3 is a partial section view showing the roller, and the radial bar in engagement therewith.

Fig. 4 is a partial section taken along the line 4—4 of the Fig. 2.

Fig. 5 is a side view of the T-trigger.

Figure 1:
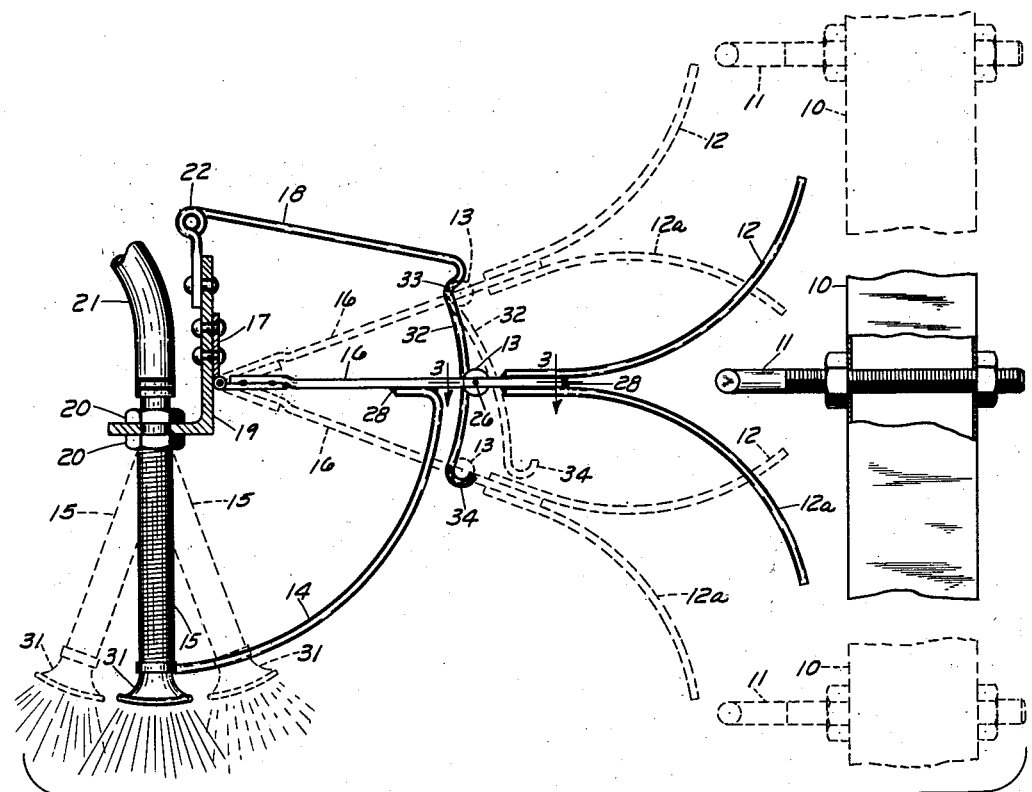
Fig. 1 is a side view of the spray device of my invention.

The Fig. 1 shows a single neutral position view of the finger assembly in solid lines, and two views, in dotted lines, of two different positions of the finger assembly and the nozzle 31.

The Fig. 5 shows the tamping bar 10 and the T-trigger 11, both shown in three different positions; the neutral position is shown in solid lines, and the uppermost and the lowermost positions are shown in dotted lines.

The Fig. 1 and the Fig. 5 comprise the complete working members of my invention. The tamping bar 10 is a conventional tamping bar as is commonly used in many of the commercial hay balers. The said bar moves in a vertical direction, and with each downward stroke tamps the forage, and then moves upwardly. The T-trigger is secured to the tamping bar by a hole drilled in the tamping bar and the two nuts shown in the Fig. 4. The nozzle 31 is secured to the flexible tubing 15. The tubing 15 is connected to the hose 21, and the said tubing is held firmly at its uppermost end by means of the angle iron bracket 19 and the two nuts 20. The bracket 17 extends upwardly and holds the hinge 17 and the spring bar 18. The finger assembly comprises the hinge 17, the plate 16, the roller 13, and the fingers 12 and 12a. The radial bar 14 is secured at one end to the plate 16 and is secured at the other end to the nozzle 31.

The spring bar 18 is secured to the upper portion of the angle bracket 19 and is bent over, forming the coil spring 22. The bar 22, which is integral with the bar 18, has two bends 33 and 34. The roller 13 which is shown in the Fig. 1 and the Fig. 3, is held by and rotates on the pin 26. The said roller and the said pin are disposed in an elongated hole formed through the plate 16. The two fingers 12 and 12a are secured on either side of the plate 16 by means of welding. The welds are designated by the numeral 28. It will be noted from the Figs. 1 and 3 that the bar 18 passes through the hole on the plate 16 and the roller 13 rides on it.

The preservative fluid storage tank is designated by the numeral 30, and the pump for carrying the fluid through the hose and the nozzle is designated by the numeral 29.

The conveyors 24, and 25, deliver the forage to the hopper 27 of the baler.

When the baler is in use the tank 30 is utilized for the storage of the liquid preservative. The hose 21 leads from the said tank to the continuous operating pump. The pump may be a conventional gear pump, for example. Since there is a tendency for forage preservative chemicals to be somewhat corrosive, it is preferred that the members of the pump be made of bronze or other non-corrosive materials. The liquid is carried through the hose 21 and through the flexible tubing 15, and through the nozzle 31, and is sprayed on the forage. To assure even distribution of the preservative on all parts of the baling forage the nozzle is systematically swung to and fro and this motion of the nozzle is motivated by the upward and downward movement of the tamping bar, and with the simultaneous movement of the T-trigger. As has already been pointed out, the spring bar 18 remains stationary during the operation. At each upward movement of the tamping bar the T-trigger engages the finger 12 and swings it upwardly on its hinge 17 until the roller 13 rolls into the radial bend 33. The fingers 12 and 12a remain in the most upwardly position until the tamping bar starts its downward movement. As the downward movement of the tamping bar proceeds the T-trigger engages the finger 12a and the finger 12a and the finger assembly is swung downwardly through the neutral position and further downwardly until the roller rolls into the radial bend 34. The finger assembly remains in the lowermost position until the tamping bar starts its upward movement. As the tamping bar proceeds upwardly, the T-trigger engages the finger 12 and the swinging movement is repeated. Since the nozzle 31 is secured to the finger assembly member 16 by the radial bar 14, the swinging movement of the finger assembly motivates the swinging movement of the nozzle 31.

I wish particularly to point out that in combination with a conventional hay baler, and particularly in combination with a conventional tamping bar of a hay baler, the preservative spraying device of my invention operates automatically without attention of the operator. It is only necessary that the operator maintain fluid in the supply tank. The swinging movement of the nozzle assures even distribution of the fluid over the surface of the forage as it is fed into the baling compartment 27 or hopper of the baler.

I wish further to point out that the structure of the device of my invention is simple, inexpensive to construct, and by virtue of this novel structure the device is sturdy and requires only a minimum amount of maintenance.

I wish further to point out that the device of my invention has been in operation for a considerable period of time on commercial balers of several different makes and has performed without fail and with excellent results.

Having clearly set forth the construction, utility and advantages of my invention I wish particularly to state that it will be apparent that changes in the details of the construction and arrangement of the various members of the invention may be resorted to without departing from the spirit and scope of the invention as hereinafter claimed.

I claim:

1. In combination with a forage baler having a tamping bar, a fluid spraying device comprising a nozzle, a flexible tube, an angle iron bracket, a radial bar, a hinged finger assembly, the said finger assembly comprising a pair of diverging fingers, a roller, a hinge, and an elongated plate, the said fingers being secured by their ends to the extending end of the said elongated plate, said plate being secured to one leaf of said hinge, and the other leaf of said hinge being secured to the said angle iron bracket, the said angle iron bracket being firmly secured to a member of the baler, the said radial bar being disposed between and secured to the said nozzle and the said plate, a spring bar, the said spring bar being secured to the said bracket, the said spring bar comprising integrally a coil spring, a straight bar, a radial portion, and a pair of radial bends formed in the said radial portion thereof, the said roller being rotatably secured in an elongated hole in the said elongated plate, the said roller being contiguous with the said spring bar and moves on one surface of the said spring bar, a T-trigger, the said trigger being secured to and disposed on the tamping bar substantially in the position of the finger assembly at its neutral position, the upward and downward reciprocating movement of the said trigger with the tamping bar being disposed to engage with one of the said fingers to provide an upward and downward swinging movement of the said finger assembly, the radial movement of the said radial bar, and the swinging motion of the said nozzle.

2. In a device for the application of preservatives to forage, a nozzle, a flexible tube, an angle iron bracket, a radial bar, a hinged finger assembly, the said finger assembly comprising a pair of diverging fingers, a roller, a hinge, and an elongated plate, the said fingers being secured by their ends to the extending end of the said elongated plate, said plate being secured to one leaf of said hinge, and the other leaf of said hinge being secured to the said angle iron bracket, the said radial bar being disposed between and secured to the said nozzle and the said plate, a spring bar, the said spring bar being secured to the said bracket, the said spring bar comprising integrally a coil spring, a straight bar, a radial portion, and a pair of radial bends formed in the said radial portion thereof, the said roller being rotatably secured in an elongated hole in the said elongated plate, the said roller being contiguous with the said spring bar and moves on one surface of the said spring bar, a T-trigger, the said trigger being disposed on a reciprocating means, the upward and downward reciprocating movement of the said trigger being disposed to engage with one of the said fingers to provide an upward and downward swinging movement of the said finger assembly, the radial movement of the said radial bar, and the swinging motion of the said nozzle.

FRANK ARTHUR WHITNEY.

References Cited in the file of this patent

UNITED STATES PATENTS

| Number | Name | Date |
| --- | --- | --- |
| 506,892 | Wiebe | Oct. 17, 1893 |
| 1,454,558 | Paton | May 8, 1923 |
| 1,732,391 | Wentworth | Oct. 27, 1929 |